(12) United States Patent
Haase et al.

(10) Patent No.: US 11,031,608 B2
(45) Date of Patent: Jun. 8, 2021

(54) CONNECTING ELEMENT FOR ELECTRICALLY CONTACT-CONNECTING SEPARATOR PLATES OF A FUEL CELL STACK

(71) Applicant: Bayerische Motoren Werke Aktiengesellschaft, Munich (DE)

(72) Inventors: Stefan Haase, Munich (DE); Florian Kriesch, Feldkirchen-Westerham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 198 days.

(21) Appl. No.: 16/444,030

(22) Filed: Jun. 18, 2019

(65) Prior Publication Data

US 2019/0312286 A1    Oct. 10, 2019

Related U.S. Application Data

(63) Continuation of application No. PCT/EP2017/078472, filed on Nov. 7, 2017.

(30) Foreign Application Priority Data

Dec. 19, 2016    (DE) .................. 10 2016 225 438.3

(51) Int. Cl.
*H01M 8/0256* (2016.01)
*H01M 8/0206* (2016.01)
(Continued)

(52) U.S. Cl.
CPC ....... *H01M 8/0256* (2013.01); *H01M 8/0202* (2013.01); *H01M 8/0206* (2013.01);
(Continued)

(58) Field of Classification Search
CPC ............ H01M 2250/20; H01M 50/10; H01M 50/172; H01M 8/0202; H01M 8/0206;
(Continued)

(56) References Cited

U.S. PATENT DOCUMENTS

2004/0028969 A1* 2/2004 Aoto ................ H01M 8/0213
429/432
2008/0003482 A1   1/2008 Komiyama et al.
(Continued)

FOREIGN PATENT DOCUMENTS

DE    10 2007 003 506 B4    1/2012
EP          2 562 863 A1     2/2013
(Continued)

OTHER PUBLICATIONS

International Search Report (PCT/ISA/210) issued in PCT Application No. PCT/EP2017/078472 dated Jan. 3, 2018 with English translation (four (4) pages).
German-language Written Opinion (PCT/ISA/237) issued in PCT Application No. PCT/EP2017/078472 dated Jan. 3, 2018 (six (6) pages).
(Continued)

*Primary Examiner* — Lingwen R Zeng
(74) *Attorney, Agent, or Firm* — Crowell & Moring LLP

(57) ABSTRACT

A connecting element for making electrical contact with at least one separator plate of a fuel cell stack includes a housing and a contact element which is arranged in the housing and has a contact end for making contact with the separator plate and has a connection end for connection to a continuing line. A positive z-direction is defined from the contact end in the direction of the connection end. A cutout is provided in the housing, wherein the contact element is positioned in the cutout. The contact end is arranged on a first side of the cutout. The connection end is arranged on the second side of the cutout. The contact element has an interlocking element which bears in an interlocking manner against the housing on the first side of the cutout.

15 Claims, 2 Drawing Sheets

(51) Int. Cl.
*H01M 2/06* (2006.01)
*H01M 2/02* (2006.01)
*H01M 8/0202* (2016.01)
*H01R 13/432* (2006.01)
*H01M 50/10* (2021.01)
*H01M 50/172* (2021.01)
*H01M 8/04537* (2016.01)
*H01R 13/533* (2006.01)
*H01R 12/51* (2011.01)

(52) U.S. Cl.
CPC ......... *H01M 50/10* (2021.01); *H01M 50/172* (2021.01); *H01R 13/432* (2013.01); *H01M 8/04537* (2013.01); *H01M 8/04559* (2013.01); *H01M 2250/20* (2013.01); *H01R 12/515* (2013.01); *H01R 13/533* (2013.01)

(58) Field of Classification Search
CPC ........... H01M 8/0256; H01M 8/04537; H01M 8/04559; H01R 12/515; H01R 13/432; H01R 13/533; Y02E 60/10; Y02E 60/50
See application file for complete search history.

(56) References Cited

U.S. PATENT DOCUMENTS

| | | | |
|---|---|---|---|
| 2008/0143061 A1* | 6/2008 | Steinbach | H01M 8/0273 277/654 |
| 2013/0209911 A1* | 8/2013 | Otake | H01M 8/0202 429/468 |

FOREIGN PATENT DOCUMENTS

| | | |
|---|---|---|
| JP | 2007- 87858 A | 4/2007 |
| JP | 2007-220338 A | 8/2007 |
| JP | 2007- 265674 A | 10/2007 |
| KR | 10-1491038 B1 | 2/2015 |
| WO | WO 2005/069026 A1 | 7/2005 |
| WO | WO 2007/102031 A1 | 9/2007 |

OTHER PUBLICATIONS

German-language Office Action issued in counterpart German Application No. 10 2016 225 438.3 dated Sep. 21, 2017 with partial English translation (11 pages).

\* cited by examiner

A-A

# CONNECTING ELEMENT FOR ELECTRICALLY CONTACT-CONNECTING SEPARATOR PLATES OF A FUEL CELL STACK

CROSS REFERENCE TO RELATED APPLICATIONS

This application is a continuation of PCT International Application No. PCT/EP2017/078472, filed Nov. 7, 2017, which claims priority under 35 U.S.C. § 119 from German Patent Application No. 10 2016 225 438.3, filed Dec. 19, 2016, the entire disclosures of which are herein expressly incorporated by reference.

BACKGROUND AND SUMMARY OF THE INVENTION

The technology disclosed here relates to a connecting element for making electrical contact with at least one separator plate of a fuel cell stack. The connecting element is, in particular, a constituent part of a connecting system for connecting the separator plates to a cell voltage monitoring module. The technology disclosed here further relates to a fuel cell system, preferably in a vehicle, including the connecting system.

Cell voltage monitoring systems for fuel cell systems include a connecting system with a connecting element for making contact with the separator plates (monopolar plates or bipolar plates) of a fuel cell stack. The connecting system further includes appropriate electrical conductors in order to connect the connecting element to a cell voltage monitoring module of the cell voltage monitoring system. The signals which are tapped off from the separator plates are processed and/or evaluated in the cell voltage monitoring module.

Cell voltage monitoring systems (CVM systems) are known, for example, from WO 2007 102031 A1 and WO 2005 069026 A1. A connecting element for making contact with the separator plates is known, for example, from DE 10 2007 003506 B4.

One object of the technology disclosed here is to reduce or to eliminate the disadvantages of solutions which are already known. In particular, one object of the technology disclosed here is to specify a connecting element for making electrical contact with at least one separator plate of a fuel cell stack, which connecting element renders possible operationally reliable and long-term electrical connection to the separator plates while being easy to produce and easy to fit.

The technology disclosed here relates, amongst other things, to a fuel cell system with a plurality of stacked fuel cells. The fuel cell system is intended, for example, for mobile applications such as motor vehicles, in particular for providing the energy for at least one drive machine for propelling the motor vehicle. In its simplest form, a fuel cell is an electrochemical energy converter which converts fuel and oxidizing agent into reaction products and in the process produces electricity and heat. The fuel cell comprises an anode and a cathode which are separated by an ion-selective or ion-permeable separator. The anode is supplied with fuel. Preferred fuels are: hydrogen, low-molecular-weight alcohol, biofuels or liquefied natural gas. The cathode is supplied with oxidizing agent. Preferred oxidizing agents are, for example, air, oxygen and peroxides. The ion-selective separator can be formed, for example, as a proton exchange membrane (PEM). A cation-selective polymer electrolyte membrane is preferably used. Examples of materials for a membrane of this kind are: Nafion®, Flemion® and Aciplex®.

A fuel cell system comprises, in addition to the fuel cells, peripheral system components (BOP components) which can be used during operation. In general, a plurality of fuel cells are combined to form a fuel cell stack.

The fuel cells of the fuel cell system generally comprise two separator plates. The ion-selective separator of a fuel cell is generally arranged between two separator plates in each case. One separator plate forms the anode together with the ion-selective separator. However, the further separator plate, which is arranged on the opposite side of the ion-selective separator, forms the cathode together with the ion-selective separator. Gas channels for fuel or for oxidizing agents are preferably provided in the separator plates.

The separator plates can be designed as monopolar plates and/or as bipolar plates. In other words, a separator plate expediently has two sides, wherein one side forms an anode together with an ion-selective separator and the second side forms a cathode together with a further ion-selective separator of an adjacent fuel cell. What are known as gas diffusion layers (GDL) are also generally provided between the ion-selective separators and the separator plates.

The technology disclosed here further relates to a cell voltage monitoring system. The cell voltage monitoring system (CVM system), in particular the cell voltage monitoring module of the cell voltage monitoring system, can be designed to monitor the state of at least one cell. In general, said system monitors the state of a plurality of fuel cells. In this context, monitoring means that the system can directly or indirectly determine the state of the monitored cells. Degradation that occurs or a cell failure can therefore advantageously be identified at an early stage and appropriate countermeasures can be initiated. As a result, the service life can possibly be increased to a certain extent and/or the performance of the cell entity can be increased by way of suitable countermeasures. Advantageously, at least one measurement variable can be directly or indirectly detected. The measurement variable can be, in particular, the electrical voltage of the monitored cell. The individual cell voltages of a plurality of or all of the cells and the total voltage are advantageously ascertained. The current flowing through the fuel cell stack is also preferably determined. From the measured voltages, the CVM system can determine, for example, one of the following values: minimum, maximum and mean value of the individual cell voltage. Therefore, voltage differences between the individual cells or from a mean value of the individual cell voltages can advantageously be identified. Further individual cell analysis methods, such as impedance calculation (e.g.: electrochemical impedance spectroscopy) for example, are preferably carried out.

The object of the technology disclosed here is achieved by a connecting element for making electrical contact with at least one separator plate of a fuel cell stack.

The connecting element can also be called a connecting plug. In its simplest refinement, the connecting element is used for making contact with a separator plate. However, in general, the connecting element is designed in order to be mounted onto a plurality of separator plates. As a result, contact can be made with a plurality of separator plates of the fuel cell stack at the same time.

The connecting element comprises a housing. At least one contact element is arranged in the housing. The arrangement and configuration of the contact element will be described in detail in the text which follows. In doing so, reference is usually made to one contact element for reasons of simplicity. However, in a preferred embodiment, a plurality of contact elements are arranged in the housing, said contact elements all being configured in line with the technology disclosed here and being arranged in the housing. The housing preferably provides electrical insulation from the surrounding area. With further preference, at least the outer walls of the housing, at least in regions, can be produced from a plastic material for insulation purposes.

The contact element has a contact end. The contact end is designed for making electrical contact with the separator plates. In particular, the contact end has a corresponding opening, for example a slot. This opening is mounted onto the separator plate.

The opposite end of the contact element is called the connection end. The connection end serves to electrically connect the contact element to a continuing line. This continuing line can comprise, for example, conductor tracks on a printed circuit board or cable.

The stacked separator plates each lie in a plane which is spanned by a y-axis and a z-axis. The connecting element is moved in the direction of the z-axis in order to be mounted and, respectively, pulled out. The plurality of separator plates are stacked next to one another along an x-axis. The three axes are each perpendicular in relation to one another.

A positive z-direction, parallel in relation to the z-axis, is defined from the contact end in the direction of the connection end. The negative z-direction runs in the opposite direction, that is to say from the connection end in the direction of the contact end.

One cutout or one passage hole (the term cutout is used for reasons of simplicity in the text which follows) for each contact element can be provided in the housing, preferably in an outer wall and particularly preferably in an end wall which runs perpendicularly in relation to the z-direction. The contact element is positioned in this cutout or is inserted into the cutout when the connecting element is assembled. The contact end is located on a first side of the cutout. The connection end is located on the second side or on the opposite side of the cutout. The contact element has a fixedly arranged or integral interlocking element. The interlocking element is located on the first side of the cutout and bears in an interlocking manner against the housing. In particular, the interlocking element bears against a region of the housing which surrounds the cutout.

The cutout in the housing is preferably smaller than the interlocking element. In this case, the cutout is "smaller" in such a way that the contact element, including the interlocking element, can be inserted into the cutout only in the positive z-direction.

According to the technology disclosed here, the contact element can therefore be inserted into the cutout of the housing in the positive z-direction. The interlocking element is fixedly arranged on the contact element and does not have to be fitted or inserted separately. In addition, fastening the contact element in a different way in the housing in order to prevent movement of the contact element in the positive z-direction is superfluous. The cutout is configured to be small enough that the interlocking element bears against the housing and consequently the contact element can be moved in the positive z-direction only as far as the stop of the interlocking element. This is particularly advantageous if the contact elements or constituent parts which are connected to the contact elements, for example a connection board, are pulled on when pulling out the connecting element from the separator plates. Owing to the interlocking element, the contact element cannot be pulled out of the housing during said pulling operation.

In a preferred embodiment, provision is made for the contact element to have a latching element. The latching element is locked onto the housing and blocks a movement of the contact element in the negative z-direction. The latching element is, in particular, a resilient element which is deformed when the contact element is inserted into the housing and locks onto a corresponding latching lug or latching cutout of the housing when said contact element is fully inserted. The latching lug preferably protrudes into the housing interior. The latching element is advantageously configured to deform, at least in regions, in a direction perpendicular in relation to the z-direction. In particular, the latching element is configured to interlock in the interior of the housing, in particular with an element of the housing such as, for example, the latching lug or latching cutout disclosed here. The connecting element, in particular the latching element and the housing, can further preferably be configured in such a way that, when the connecting element is in the assembled state, the latching element is accessible for removal purposes. In particular, a removal opening can be provided on the housing for this purpose, it being possible for a removal tool (for example a dismantling tool) to be inserted through said housing. The removal tool can be designed to deform the latching element such that the latching element becomes detached.

The latching element serves primarily to prevent the contact element from falling out of the housing when the connecting element is being assembled or put together. As will be described in detail below, the connection end of the contact element is preferably fixedly connected to the continuing line, in particular to a connection board, on the second side of the cutout. This connection also prevents, generally substantially more reliably than the latching connection, movement of the contact element in the negative z-direction relative to the housing.

The latching element is preferably arranged on the first side of the cutout. There is a sufficient amount of installation space on the first side of the cutout. As an alternative, provision is also made for the latching element to be arranged in the cutout. Furthermore, provision is preferably made for the latching element to be arranged on the second side of the cutout if there is a sufficient amount of installation space between the housing and the connection board here.

In a preferred embodiment, the contact element has a main body composed of metal, in particular sheet metal. Said sheet metal serves as an electrical conductor; the contact end and the connection end are formed from the sheet metal.

The latching element is preferably a tongue which is bent out of the metal or sheet metal. When the contact element is inserted into the housing, the tongue is initially deformed by way of contact with the housing and then locks onto the corresponding point.

The interlocking element, preferably composed of plastic, is advantageously fastened to the metal or sheet metal. To this end, the interlocking element can be positioned or injection-molded onto the metal or sheet metal for example. In an alternatively preferred variant, the interlocking element is also formed by corresponding shaping of the metal or sheet metal.

In a preferred embodiment, the continuing line comprises a connection board. The connection board is located in or on the housing, specifically on the second side of the cutout.

The connection end of the contact element is electrically conductively connected to the connection board.

In particular, provision is made for the connection end to be mechanically fixedly connected to the connection board. In particular, the connection end is soldered to the connection board.

The technology disclosed here further comprises a connecting system. The connecting system is designed for connecting separator plates of the fuel cell stack to a cell voltage monitoring module. The connecting system comprises at least one of the described connecting elements, a cell voltage monitoring board and at least one of the continuing lines in order to electrically conductively connect the connecting element, in particular the connection board, to the cell voltage monitoring board.

The cell voltage monitoring board is configured for receiving the cell voltage monitoring module. In the cell voltage monitoring module, the signals which are tapped off by means of the connecting elements are processed and/or evaluated or the signals are at least passed on to a superordinate computer unit. The cell voltage monitoring board and therefore also the cell voltage monitoring module can be electrically conductively connected to a plurality of the connecting elements.

The advantageous refinements described in the context of the disclosed connecting element can be applied to the disclosed connecting system in a correspondingly advantageous manner.

The technology disclosed here further comprises a fuel cell system. The fuel cell system is located, in particular, in a vehicle. The fuel cell system comprises at least one connecting system of the kind just described, a fuel cell stack with separator plates, contacted by the connecting element, and a cell voltage monitoring module on the cell voltage monitoring board. The advantageous refinements described in the context of the disclosed connecting element can be applied to the disclosed fuel cell system in a correspondingly advantageous manner.

The technology disclosed here further comprises a method for assembling the described connecting element. In said method, the contact element is inserted into the cutout in the positive z-direction, that is to say from the first side of the cutout in the direction of the second side. In the process, the interlocking element comes to bear against the housing. The latching element which is preferably to be used locks in the housing. The advantageous refinements and dependent claims described in the context of the disclosed connecting element can be applied to the disclosed method in a correspondingly advantageous manner.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
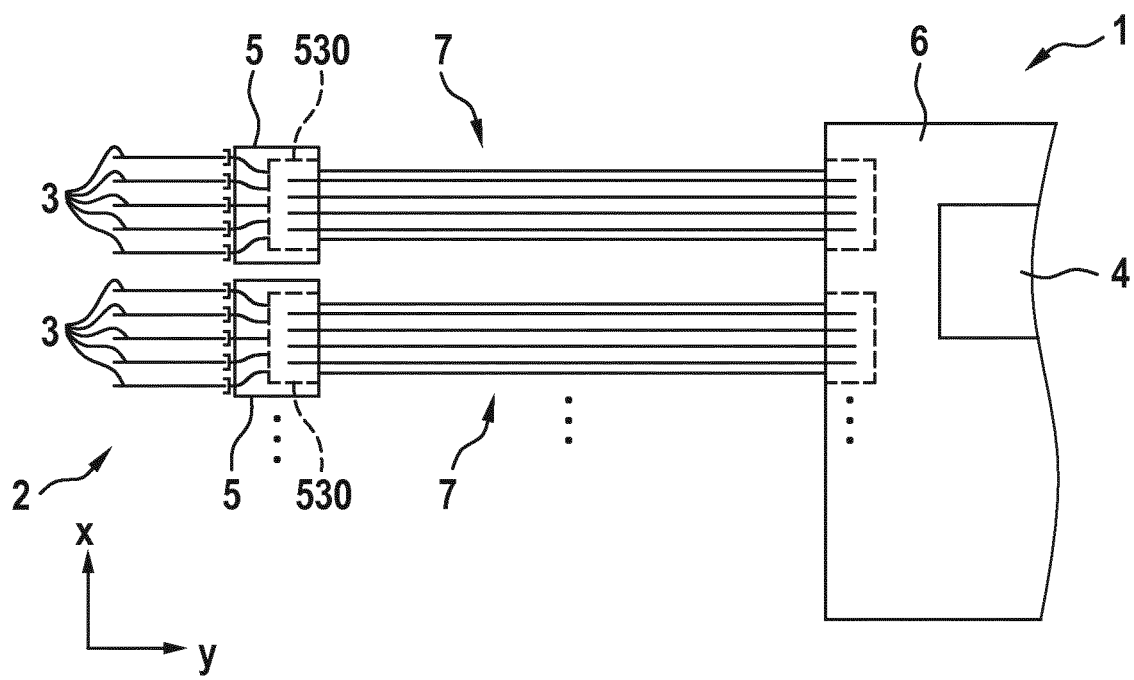
FIG. 1 is a schematic illustration of the fuel cell system, comprising the connecting system with the connecting element.

The figures show the disclosed connecting element 5 as a constituent part of a connecting system 1 in a fuel cell system 2.

The fuel cell system 2 is used, in particular, in a vehicle. The fuel cell system 2 comprises a fuel cell stack with a plurality of separator plates 3. The separator plates 3 are, in particular, monopolar plates or bipolar plates of the fuel cell stack.

Furthermore, the fuel cell system 2 comprises a cell voltage monitoring module 4. The cell voltage monitoring module 4 is electrically conductively connected to the separator plates 3 by means of the connecting system 1. The unit comprising the connecting system 1 and the cell voltage monitoring module 4 can also be called the cell voltage monitoring system.

The connecting system 1 comprises a connecting element 5, a cell voltage monitoring board 6 for receiving the cell voltage monitoring module 4, and a continuing line 7 for connecting the connecting element 5 to the cell voltage monitoring board 6.

Figure 2:
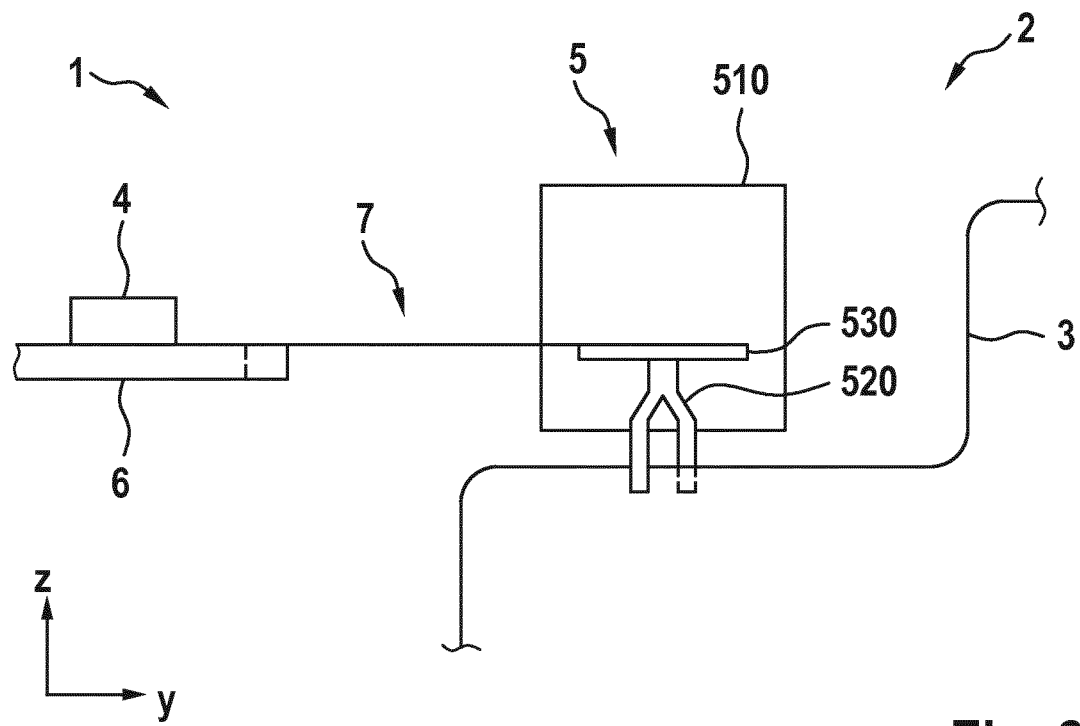
FIG. 2 is a further schematic illustration of the fuel cell system, comprising the connecting system with the connecting element.

FIGS. 1 and 2 show the basic arrangement of a plurality of connecting elements 5 on the fuel cell stack. As shown in FIG. 1 in particular, each connecting element 5 makes electrically conductive contact with a plurality of the separator plates 3 of the fuel cell stack. In the exemplary embodiment shown, said contact-connection serves to connect the separator plates 3 to the cell voltage monitoring module 4. However, the connecting element 5 disclosed here can also be used for making contact with the separator plates 3 for use in a different way.

The connecting element 5 comprises a housing 510. As shown in FIGS. 1 and 2, a plurality of contact elements 520 for making contact with a plurality of separator plates 3 are arranged in the housing 510. The exact configuration and arrangement will be described below with reference to FIGS. 3 and 4 using the example of a contact element 520.

Figure 3:
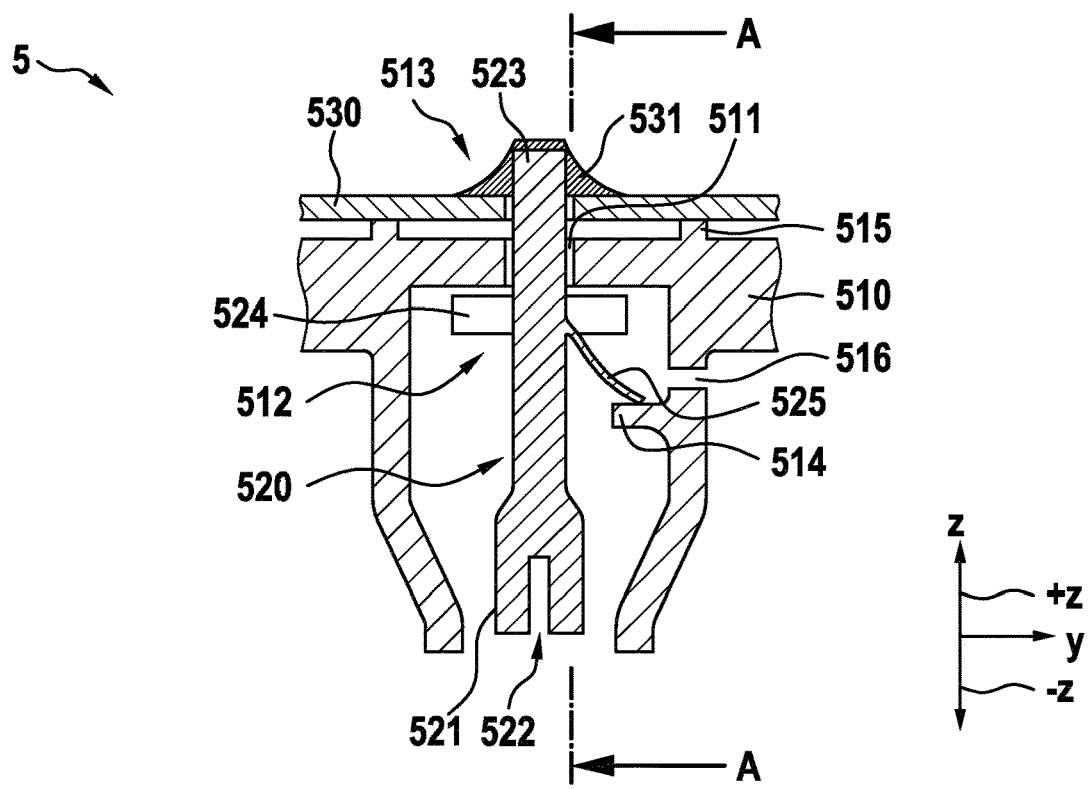
FIG. 3 is a schematic sectional view of the connecting element.
Figure 4:
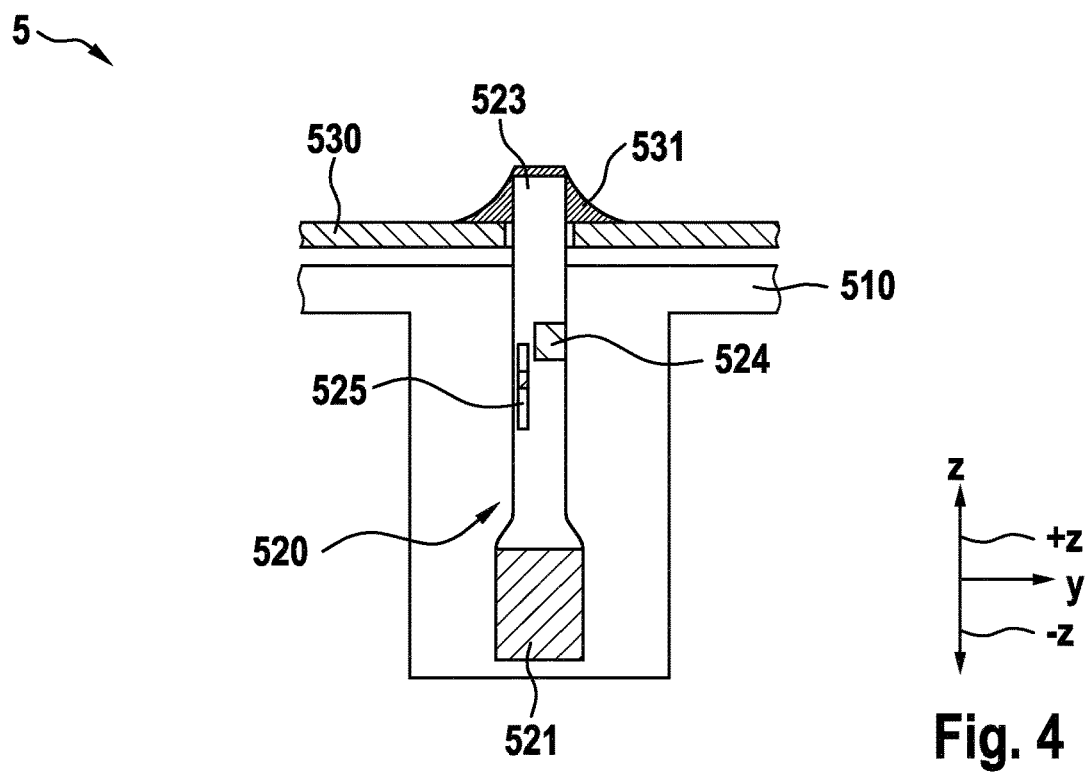
FIG. 4 shows the section A-A identified in FIG. 3.

According to FIGS. 3 and 4, a connection board 530 is seated on the housing 510. The connection board 530 is seated on spacers 515 of the housing 510. The housing 510 can also be configured such that the connection board 530 is arranged in the interior of the housing 510.

The housing 510 has a cutout 511. The cutout 511 is designed as an aperture or passage hole in the housing 510. The contact element 520 is positioned in this cutout 511. That side of the housing 510 which is at the bottom in relation to the cutout 511 is called the first side 512. The opposite side, above the cutout 511 in the figures, is called the second side 513. The connection board 530 is located on the second side 513.

The contact element 520 has a contact end 521. An opening 522 is formed in the contact end 521. By way of this opening 522, the contact end 521 of the contact element 520 is mounted on the separator plate 3 with which electrical contact is to be made.

The contact element 520 has a connection end 523 at the opposite end. The connection end 523 is positioned in the connection board 530 and is both electrically conductively and also mechanically fixedly connected to the connection board 530 by way of a solder point 531.

The contact end 521 is located on the first side 512 of the cutout 511. The connection end 523 is located on the second side 513 of the cutout 511.

An interlocking element 524 is formed on the contact element 520 on the first side 512 of the cutout 511. The interlocking element 524 is a fixed constituent part of the contact element 520.

The figures show three axes which are each perpendicular to one another. The individual separator plates 3 are located in a plane which is spanned by the y-axis and z-axis. The plurality of separator plates 3 are stacked one on the other along the x-axis.

A positive z-direction is defined from the contact end 521 in the direction of the connection end 523. The negative z-direction runs in the opposite direction. When the connecting element 5 is mounted onto the separator plates 3, the connecting element 5 is mounted along the negative z-direction. When the connecting element 5 is pulled out, the connecting element 5 is pulled out along the positive z-direction.

During assembly of the connecting element 5, the contact element 520 is inserted into the housing 510 from the bottom, that is to say in the positive z-direction. The cutout 511 in the housing 510 is substantially smaller than the interlocking element 524. As a result, the interlocking element 524 bears against the housing 510 and blocks a further movement of the contact element 520 relative to the housing 510 along the positive z-direction.

Furthermore, a latching lug 514 is formed in the housing 510. The contact element 520 has a latching element 525. During fitting of the contact element 520 into the housing 510, the latching element 525 locks onto the latching lug 514; what is known as primary locking is produced. This latching connection can also be configured in a different way. For example, instead of the latching lug 514, a corresponding recess or an undercut in the housing 510 can also be used for the latching element 525 to lock onto.

A passage recess 516 for inserting a dismantling tool for releasing the primary locking is preferably located in the housing 510 to the side of the latching element 525.

FIG. 4 shows the section A-A identified in FIG. 3. This schematic illustration shows that, given corresponding configuration and positioning of the latching lug 514 and of the interlocking element 524, the two elements can be arranged at approximately the same height or next to one another.

The above description of the present invention serves only for illustrative purposes and not for the purpose of restricting the invention. Various changes and modifications are possible in the context of the invention without departing from the scope of the invention and of its equivalents.

LIST OF REFERENCE SIGNS

1 Connecting system
2 Fuel cell system
3 Separator plates
4 Cell voltage monitoring module
5 Connecting element
510 Housing
511 Cutout
512 First side
513 Second side
514 Latching lug
515 Spacer
516 Passage recess
520 Contact elements
521 Contact end
522 Opening
523 Connection end
524 Interlocking element
525 Latching element
530 Connection board
531 Soldering point
6 Cell voltage monitoring board
7 Continuing line The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connecting element for making electrical contact with at least one separator plate of a fuel cell stack, comprising:
   a housing;
   a contact element which is arranged in the housing and has a contact end for making contact with the separator plate and has a connection end for connection to a continuing line, wherein a positive z-direction is defined from the contact end in the direction of the connection end;
   a cutout in a wall of the housing, wherein
   the cutout is a passage hole,
   the contact element is positioned in the cutout,
   the contact end is arranged on a first side of the cutout in the wall of the housing,
   the connection end is arranged on a second, opposite, side of the cutout in the wall of the housing,
   the contact element has an interlocking element which bears in an interlocking manner against the housing on the first side of the cutout, and
   the contact element is formed so as to be insertable into the cutout in the positive z-direction.

2. The connecting element according to claim 1, wherein the contact element has a latching element which is locked onto the housing and blocks a movement of the contact element in the negative z-direction.

3. The connecting element according to claim 2, wherein the latching element is arranged on the first side of the cutout.

4. The connecting element according to claim 2, wherein the contact element comprises a main body composed of metal, and
the latching element is a tongue which is bent out of the main body.

5. The connecting element according to claim 1, wherein the cutout is smaller than the interlocking element so that the contact element is insertable into the cutout only in the positive z-direction.

6. The connecting element according to claim 1, wherein the contact element comprises a main body composed of metal, and
the interlocking element is fastened to the metal.

7. The connecting element according to claim 6, wherein the interlocking element is made of plastic.

8. The connecting element according to claim 1, wherein the continuing line comprises a connection board in or on the housing on the second side of the cutout, and
the connection end is electrically conductively connected to the connection board.

9. The connecting element according to claim 8, wherein the connection end is mechanically fixedly connected to the connection board.

10. The connecting element according to claim 9, wherein the mechanically fixed connector is a soldered connection.

11. The connecting element according to claim 1, further comprising:
a plurality of contact elements are arranged in the housing, wherein each of the plurality of contact elements is in a dedicated cutout in the housing.

12. The connecting element according to claim 2, wherein the connecting element is configured such that, when the connecting element is in an assembled state, the latching element is accessible through at least one removal opening for removal purposes.

13. A connecting system for connecting separator plates of a fuel cell stack to a cell voltage monitoring module, comprising:
at least one of the connecting elements according to claim 1;
a cell voltage monitoring board configured to receive the cell voltage monitoring module; and
at least one continuing line from the connecting element to the cell voltage monitoring board.

14. A fuel cell system in a vehicle, comprising:
at least one connecting system according to claim 13;
a fuel cell stack with separator plates, contacted by the connecting element; and
a cell voltage monitoring module on the cell voltage monitoring board.

15. A method for assembling a connecting element according to claim 1 for making electrical contact with at least one separator plate of a fuel cell stack, wherein the contact element is inserted into the cutout in the positive z-direction.

* * * * *